United States Patent [19]

Milgrom

[11] 3,900,518

[45] Aug. 19, 1975

[54] HYDROXYL OR THIOL TERMINATED TELOMERIC ETHERS

[75] Inventor: Jack Milgrom, Concord, Mass.

[73] Assignee: The General Tire & Rubber Company, Akron, Ohio

[22] Filed: Dec. 10, 1973

[21] Appl. No.: 423,194

Related U.S. Application Data

[60] Continuation of Ser. No. 130,776, April 2, 1971, abandoned, which is a division of Ser. No. 676,712, Oct. 20, 1967, Pat. No. 3,654,224.

[52] U.S. Cl. .............................. 260/573; 260/577
[51] Int. Cl.² ................. C07C 93/14; C07C 87/62
[58] Field of Search ........................... 260/577, 573

[56] References Cited
UNITED STATES PATENTS

| 2,674,619 | 4/1954 | Lundsted | 260/573 X |
| 3,278,457 | 10/1966 | Milgrom | 260/2 |
| 3,278,458 | 10/1966 | Belner | 260/2 |
| 3,278,459 | 10/1966 | Herold | 260/2 |
| 3,405,162 | 10/1968 | Kuryla | 260/573 X |
| 3,654,224 | 4/1972 | Milgrom | 260/577 X |

Primary Examiner—Elbert L. Roberts
Assistant Examiner—S. P. Williams
Attorney, Agent, or Firm—Kemon, Palmer & Estabrook

[57] ABSTRACT

Hydroxyl or thiol terminated alkylene ether telomers varying from liquids to thermoplastic solids and composed of one or more telomer moieties from cyclic ether taxogen joined through a carbon atom to a telogen moiety are prepared by telomerization of cyclic ether monomer with a primary or secondary aromatic amine as a telogen in the presence of catalyst of the double metal cyanide complex class. As a specific example, a hydroxyl terminated telomer is prepared by telomerization of propylene oxide with aniline using zinc hexacyanoferrate-diglyme complex as the telomerization catalyst.

8 Claims, No Drawings

HYDROXYL OR THIOL TERMINATED TELOMERIC ETHERS

CROSS REFERENCE TO RELATED APPLICATIONS

This is a continuation of application Ser. No. 130,776, filed Apr. 2, 1971, now abandoned, which is, in turn, a division of application Ser. No. 676,712, filed Oct. 20, 1967, now U.S. Pat. No. 3,654,224.

BACKGROUND OF THE INVENTION

The invention relates to improvements in several established chemical operations, namely, (a) use of complex cyanide catalysts for polymerizations, (b) telomerizations, and (c) preparations of complex polymeric ethers. Utilizing new techniques within these general categories of reactions, new forms of polymeric ethers have been created which are distinguished in part, by chemical structure, and, in part, by physical properties from polymeric ethers known heretofore.

The usefulness of complex cyanide catalysts for the preparation of polyethers is known and organoactivated catalyst complexes of this class have been fully described, e.g., see U.S. Pat. Nos. 3,278,457; 3,278,458 and 3,278,459. The use of these catalysts is now extended as disclosed herein into the telomerization of cyclic ethers, e.g., alkylene oxides, with carboxylic acids or some other telogens having replaceable hydrogen atoms.

The mechanism of telomerization has been understood in the chemical arts for some time (see U.S. Pat. No. 2,409,683). As originally defined by Hanford et al. (U.S. Pat. No. 2,402,137), telomerizations are a form of polymerization in which a reactant, called a telogen, enters the reaction to limit molecular weight of the resulting product according to the general equation:

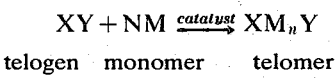

telogen monomer telomer

The telomerization reaction is extended by the present invention according to the following equation:

$$XY_a + nM \rightarrow X(M_{n/a}Y)_a$$

where
- $a$ = the number of telogenic functions in the telogen;
- $n$ = the number of monomer units, and
- $n/a$ = the average number of monomer molecules in the telomer moiety.

The monomer, which is also called a taxogen, is the major reactant in a telomerization and the telomer moiety derived from the taxogen constitutes generally the principal mass of the telomerization product. In the procedures of this present invention, any individual polymer molecule of the polymeric mass has one telogen moiety. Since the major telomer moieties are polyether groups which are hydroxyl or thiol terminated, the new products can also be designated as polyether polyols or polyether polythiols.

The double metal cyanide complex catalysts effect polymerization by a "growth type" of reaction in which there is a continuing transfer of a proton from an active site generated by the catalyst to a new monomer molecule. This type of reaction enables block copolymers to be created by sequential addition techniques and this can be utilized in this present invention to form new telomeric polyethers of block copolymer configuration. In the new processes, it is believed the telogen, e.g., a carboxylic acid, acts as a chain transfer agent and produces polymers of controlled molecular weight and narrow molecular weight distribution in preferred embodiments. The efficiency of this growth type reaction is emphasized by the fact that as many as 500 telomer chains per catalyst unit may be formed.

OBJECTS

A principal object of this invention is the creation of new forms of hydroxyl or thiol terminated polymeric alkylene ethers.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

These objects are accomplished through the present invention by reacting at least one polymerizable cyclic ether containing 2 to 18 carbon atoms as hereinafter defined, in the presence of a polymerization catalyst of the (preferably organo-activated) double metal cyanide complex class, with a telogen having a replaceable hydrogen atom (s), e.g., a carboxylic acid, thereby producing hydroxyl or thiol terminated alkylene ether or thioether telomer, e.g., telomeric carboxylic esters as hereinafter defined.

The term "cyclic ether" is used in this specification and accompanying claims to include compounds that comprise either oxygen or sulfur atoms in the cyclic ether ring.

Such compounds useable in this invention can be designated by the following general formula:

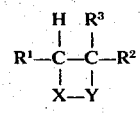

wherein:
- X is oxygen or sulfur,
- Y is —CH$_2$—or the bond in the cyclic ether between the carbon atom and the hetero-atom X and
- R$^1$, R$^2$ and R$^3$ are hydrogen, hydrocarbon, halohydrocarbon, carbon oxycarbon, carbonthiacarbon, halocarbonoxycarbon or nalocarbonthiacarbon radicals.

Advantageously, such monomers for the new telomerizations are organic cyclic oxide monomers having a ring of 2 to 3 carbon atoms and 1 oxygen atom, the oxide being an epoxide, oxetane, 3-substituted oxetane or 3,3-disubstituted oxetane. Mixtures of any of the cyclic ethers as defined may be employed or different monomers may be charged into the reaction sequentially.

The catalysts are of the known double metal cyanide complex type containing a metal ion which is joined to the nitrogen atom of a cyano group by a coordinate bond and a transition metal having a relatively strong covalent bond with the carbon atom of the cyano group. Advantageously, the catalysts are activated by an organic complexing agent, e.g., alcohol, aldehyde, ketone, ether, ester, sulfide, amide, or nitrile.

In general terms, the invention provides a new class of hydroxyl or thiol terminated alkylene ether telomers that may be represented by the general formula:

$$[HX-T]_n Z$$

wherein

X is oxygen or sulfur,

T is the telomer moiety from a polymerizable cyclic ether as hereinbefore defined, n is an integer, particularly between 1 and 3, Z is a telogen moiety from an organic compound having an activated or replaceable hydrogen atom(s) selected from the following group:

primary and secondary aromatic amines,

Activated hydrogen atoms are those adjacent carbonyl radicals, on the carbon atom of a triple bond and so forth; and they, also, are replaceable. Replaceable hydrogen atoms are those of carboxylic groups, amino groups and so forth.

EXAMPLES

The following details of operations in accordance with the invention and reported data illustrate the further principles and practice of the invention to those skilled in the art. In these examples and throughout the remaining specification and claims, all parts and percentages are by weight all temperatures are in degrees centigrade unless otherwise specified.

EXAMPLE 1

A mixture of 100 parts propylene oxide, 3.3 parts of aniline and 0.06 parts of zinc hexacyanoferrate-diglyme catalyst was heated for 48 hours at 35°C. After the unreacted monomer and telogen were evaporated at 100°C. below 1 mm. Hg. for 25 hours, 55.9 parts of a clear orange-brown heavy oil was obtained as the product.

Analysis showed the product to contain less than 0.05% free aniline and the presence of an aromatic ring, hydroxyl groups and secondary amine groups. Analysis further showed that 29% of the aniline had reacted so that both hydrogen atoms on the amino group were replaced to give a polyether diol and 71% reacted only one hydrogen to give a telomer with a hydroxyl group at one end and a $C_6H_5NH-$ group on the other. The telomer molecular weight (VPO) was 1620, the combined -OH and -NH content was 1.203 mmoles/g. and the functionality was 1.95.

In another case, this procedure was repeated using 0.1 part of the catalyst and heating for 50 hours at 35°C. A yield of 98.7 parts of liquid telomer were obtained corresponding to a conversion of 95.5% of the propylene oxide. Analysis of the product produced the following data:

| | |
|---|---|
| Mol. wt. (VPO) | 2520 |
| —OH,—NH content | 0.723 mmoles/g. |
| Functionality | 1.82 |
| % diol | 22 |

In yet another case, 50 parts of propylene oxide and 1.65 parts of aniline were reacted in the presence of 0.03 part of zinc hexacyanocobaltate-glyme catalyst at 35°C. for 49 hours. The yield of liquid telomer was essentially quantitative. Analysis of the product give the following data:

| | |
|---|---|
| Mol. Wt. (VPO) | 2800 |
| —OH,—NH content | 0.710 mmoles/g. |
| Functionality | 1.99 |
| % diol | 60 |

In a further case, 100 parts of propylene oxide and 0.2 part of aniline were reacted in the presence of 0.025 part of zinc hexacyanoferrate diglyme catalyst and 0.025 part of PBNA at 35°C. for 25 hours giving 24.4 parts of a grease-like product which had a molecular weight of 8300, a functionality of 2.05 and a combined —OH, —NH content of 0.244 mmoles/g.

EXAMPLE 2

Into an autoclave equipped with an oil-driven stirrer, there were charged 2000 parts of propylene oxide and 2 parts of zinc hexacyanocobaltate-glyme catalyst. Then 93 parts of aniline were added and the mixture while being stirred was heated for 12 hours at 50°C. There was 100% conversion to product which had the following analysis:

| | |
|---|---|
| Mol. Wt. (VPO) | 2100 |
| —OH, —NH content | 0.973 mmoles/g. |
| Functionality | 2.0 |
| % diol | 67 |

An equal number of moles of the product and p,p'-diisocyanatodiphenyl urethane were heated and then mixed together at 60°C. in a metal container. The mixture was then cast into a metal pan in which it was oven-baked at 90°C. for 44 hours. A rubbery soluble polyurethane was formed having a Williams Plasticity of 142.

EXAMPLE 3

A mixture of 50 parts propylene oxide and 3 parts of N-ethylaniline was reacted in the presence of 0.03 part of zinc hexacyanocobaltate-glyme complex catalyst at 50°C. for 44 hours. After unreacted PO and EA were removed by evaporation, a yield of 52.2 parts of clear viscous liquid product were obtained. Infrared analysis indicated the absence of —NH groups but the presence of —OH groups and potentiometric titration of the product indicated 76% of the amine charged was converted. Further analysis on the product showed a molecular weight (VPO) of 2200, an —OH content of 0.484 mmoles/g. and a functionality of 1.06.

EXAMPLE 4

A mixture of 2 parts of p-phenylene diamine and 100 parts of propylene oxide was reacted in the presence of 0.1 part of zinc hexacyanoferrate-diglyme complex catalyst at 50°C. for 24 hours. The dark brown, gummy product amounted to 19.5 parts and was soluble in benzene, whereas the diamine was not. Potentiometric titration indicated all of the diamine was consumed giving a product with secondary amine and hydroxyl groups and without tertiary amino groups. The molecular weight was 1071, the combined —NH, —OH content was 3.41 mmoles/g. and the functionality was 3.65.

The product was tested as an antiozonant by addition to a styrene-butadiene rubber (SBR 1502) and also to an acrylonitrile-butadiene rubber ("Hycar 1052"). The product prevented cracking when bent loops of the rubbers were exposed to 50 pphm. ozone for 1 hour.

MONOMER

The organic cyclic ethers as hereinbefore defined to be telomerized in accordance with the invention include cyclic oxides (such as 1,2-epoxide, oxetane, 3-substituted oxetane or 3,3-disubstituted oxetane) having an oxygen-carbon ring in which an oxygen atom is joined to 2 or 3 carbon atoms in the ring which will open and telomerize with the same or other cyclic oxide monomers in the presence of the catalyst and having up to a total of 18 carbon atoms. These monomers, also, may contain 1,2 or more, preferably only 1, aliphatic carbon-to-carbon double bonds. The alkenyl, ether and halogen (except easily ionizable halogen substituted derivatives) substituted derivatives of these cyclic oxides can likewise be employed. The sulfur analogs of these cyclic oxides may be used. Any of these reagents should be pure to obtain the best results.

Examples of useful oxides are ethylene oxide (1,2-epoxy ethane), 1,2-propylene oxide 1,2-butene oxide (or 1,2-epoxy butene), 2,3-butene oxide, 1,2-dodecane monoxide, isobutylene monoxide, styrene oxide, 1,2-pentene oxide, isopentene oxide, 1,2-di-isobutylene oxide, 1,2-hexene oxide, 1,2-heptene oxide, allyl glycidyl ether, crotyl glycidyl ether, isoheptene oxide, 1,2-octene oxide, 1,2-nonene oxide, 1,2-decene oxide, 1,2-hendecene oxide, methyl glycidyl ether, ethyl glycidyl ether, phenyl glycidyl ether, 4-chloro phenyl glycidyl ether, butadiene monoxide, isoprene monoxide, oxetane ($C_3H_6O$), tolyl glycidyl ether, 3,3-dimethyl oxetane, 3-n-nonyl oxetane, 3-allyl-3-methyl oxetane, 3-vinyl-3-methyl oxetane, 1,2-pentadecene oxide, 3,3-diethyl oxetane, 3-ethyl-3-butyl oxetane, 3-chloromethylene oxetane, 3-chloromethyl-3-methyl oxetane, 3-methyl-3-ethyl oxetane, and other cyclic oxides.

The corresponding sulfur analogs in which a sulfur atom replaces the oxygen atom in the cyclic ether are comtemplated for use. Examples of such cyclic sulfides are:
4,5-epithio-1-pentene; 5,6-epithio-1-hexene; 5,6-epithio-2-hexene; 9,10-epithio-1-decene; 7,8-epithio-2-methyl-1-octene; 1,2-epithio-1-(2-cyclopenten-1-yl)ethane; 3-allyloxy-1,2-epithio propane; 3-(2-butenyloxy)-1,2-epithio propane, 1,2-epithio-1-(3-cyclohexen-1-yl)ethane; 3-(1-methyl allyloxy)-1,2-epithio propane; 3-(1-methyl-1-butenyloxy)-1,2-epithio propane; 3-(2-cyclohexen-1-yloxy)-1,2-epithio propane; 3-(3-methyl-4-hexenyloxy)-1,2-epithio propane; ethylene sulfide; 2,3-epithio butane; 1,2-propylene sulfide; cyclohexene sulfide; isobutylene sulfide; styrene sulfide; vinyl thiirone; 1,2-octene episulfide; crotyl oxy-1,2-epithio propane; 2-butene sulfide; 2,3-dimethyl-2-butene sulfide; 3,3-dimethyl thiocyclobutane; 3-chloropropene sulfide; thiocyclobutane; allyl thio-1,2-epoxy propane; 3-(1-chloro-4-butenyloxy)-1,2-epithio propane; 3-(1-bromo-4-butenyl)-1,2-epithio propane; 3-(1-fluoro-4-butenyl thio)-1,2-epithio propene; and 3-(1-iodo-4-hexenyl thio)-1,2-epoxy propane.

It is preferred to use the lower molecular weight cyclic oxides containing from 2 to 12 carbon atoms, e.g., ethylene oxide, propylene oxide, allyl glycidyl ether, crotyl glycidyl ether, 1,2-butene oxide, phenyl glycidyl ether, styrene oxide, ethyl glycidyl ether and propyl glycidyl ether. Mixtures of 2, 3, 4, 5 or more of the cyclic oxide monomers can be used for telomerization.

CATALYST

Catalysts useable in accordance with the invention are of the class referred to as double metal cyanide complexes which are preferably treated with organic complexing agents. Their preparation has been detailed in prior publications (see U.S. Pat. Nos. 3,278,457; 3,278,458 and 3,278,459) and in copending U.S. patent application Ser. No. 496,721, filed Oct. 15, 1965 which patents and prior application disclosures on the catalyst preparation are incorporated herein by reference.

The catalyst is most usefully prepared by reacting a transition metal cyanide complex with a metal salt in aqueous media. Removal of a substantial amount or all of the water present in the catalyst is very desirable to enhance the activity of the catalyst although it would appear that removal of all the water is not practicable and may not be desirable. Removal of most of the water and enhancement of the activity of the catalyst is attained by treatment with an additional complexing or coordinating material such as an alcohol, ether, ester, sulfide, ketone, aldehyde, amide, nitrile or mixtures thereof. Preferred organic treating agents are the substantially water-soluble saturated acrylic aliphatic polyethers free of active hydrogen atoms (Zerewitinoff) and having a molecular weight of up to about 400 such as glyme, diglyme, glyet, diglyet and the like.

In general the complex catalysts free of organic treating agents employed in the present invention have the following rational formulae:

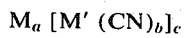

$$M_a [M' (CN)_b]_c$$

and/or

$$M_a [M' (CN)_r(X)_t]_c.$$

M is a metal ion that forms a metal-oxygen bond that is relatively more stable than the coordinate bond between the metal and the nitrogen atom of the cyano, CN group. On the other hand, M' is a transition metal ion that exhibits more than one stable valence and forms a relatively strong covalent bond with the carbon atom of the CN group. An individual catalyst can contain more than one type of M or M' metal ion in its structure. Also, $a$, $b$, and $c$ are numbers whose values are functions of the valences and coordination numbers of M and M', and the total net positive charge on M times $a$ should be equal essentially to the total net negative charge on

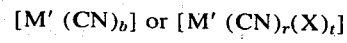

$$[M' (CN)_b] \text{ or } [M' (CN)_r(X)_t]$$

times $c$.

The $CN^-$ group in the catalyst is the bridging group, and can constitute all of the bridging groups in the catalyst. However, other bridging groups can be present in the catalyst so long as the catalyst contains at least a majority of $CN^-$ bridging groups. Thus, $r$ and $t$ are numbers and $r$ is greater than $t$ times the valence of X and $t$ is zero when only the CN group is the bridging group. Other bridging groups, X in the right hand formula above, which can be present with the $CN^-$ group, can be $F^-$, $Cl^-$, $Br^-$, $I^-$, $OH^-$, $NO$, $O^{2-}$, $CO$, $H_2O$, $NO^-$, $C_2O_4^{2-}$, or other acid radical, $SO_4^{2-}$, $CNO^-$ (cyanate), $CNS^-$ (thiocyanate), $NCO^-$ (isocyanate), and $NCS^-$ (isothiocyanate) and so forth.

In the above formulae, M is preferably a metal selected from the group consisting of Zn(II), Fe(II), Co(II), and Ni(II). On the other hand, M' is preferably a metal selected from the group consisting of Fe(II), Fe(III), Co(III), and Cr(III).

Examples of preferred catalysts which fall within the above description and which may be used are zinc hexacyanoferrate (III), zinc hexacyanoferrate (II), nickel (II) hexacyanoferrate (II), nickel (II) hexacyanoferrate (III), zinc hexacyanoferrate (III) hydrate, cobalt (II) hexacyanoferrate (II), nickel (II) hexacyanoferrate (III) hydrate, ferrous hexacyanoferrate (III), cobalt (II) hexacyanocobaltate (III), zinc hexacyanochromate (III), and mixtures thereof.

TELOGEN

Telogens used in the invention are primary and secondary amines which have an amino nitrogen atom attached to an aromatic radical. Any aromatic group substitution is considered suitable although monocyclic aryl amines are preferred, e.g., aniline, N-alkyl anilines, p-phenylene diamine, p-aminophenol, p-methyl aniline, p-aminobenzoic acid, m-chloro aniline, o-hexyl aniline, 2,4,5-trichloro aniline, p-iodoaniline, m-bromoaniline, 2-methyl-4-chloroaniline, 4-(p-aminophenyl)butanol, N-phenyl hexamethylene diamine, N-(p-toly)diethylene triamine and the like. If the nitrogen atom of a secondary amine is attached to two aromatic rings, steric hindrance around the nitrogen atom will reduce the reactivity of the amine as a telogen, e.g., phenyl-beta-naphthylamine. Aromatic amines other than monocyclic aryl amines may be used, e.g., naphthylamine, N - phenyl-N'-naphthyl ethylene diamine, N-naphthyl-N'-hydroxy hexamethylene diamine, etc.

The nature of the end group of the telomer obtained using amines depends upon the structure of the telogen and the reaction conditions. If a primary amine is used as the telogen, two types of difunctional products are possible. Both hydrogen atoms attached to the nitrogen atom can be replaced to give a diol, or only one hydrogen atom can be replaced to give a compound with a hydroxyl group at one end and a sec.-amine group at the other end of the polymer chain. To replace both hydrogen atoms requires more vigorous conditions - elevated temperature and active catalyst. If a sec.-amine group is desired, more moderate conditions and catalysts are effective. If a secondary monoamine is used as the telogen, then the telomer contains a hydroxyl group at one end and a tert.-amine at the other.

The amount of monomer to be used with relation to the telogen will depend on the ultimate purpose to be achieved. In general, the ratio of the mols of the epoxide or monomer to the number of functional groups of the telogen will vary from about 10,000:1 to 1:10, preferably from about 240:1 to 1:1. It can be said that there should be at least 1 mol of monomer per mol telogen and at least sufficient monomer should be used to provide a plurality of new ether linkages. It will be appreciated that where a relatively high molecular weight (150,000) polyalkylene ether ester is desired, the mol ratio of the epoxide or oxetane monomer such as ethylene oxide to a low molecular weight telogen, e.g., acetic acid, having only one functional group will be rather high, for example, about 3400 to 1. In making a 4000 M.W. polymer from propylene oxide and isophthalic acid, the mol ratio of epoxide to telogen is about 66:1 and the ratio of mols epoxide to carboxylic groups of the telogen is about 33:1. On the other hand, starting with an acidic copolymer of acrylic acid and methyl acrylate where it is desired to alter its crystallinity, film forming characteristics, and the like, it may only be necessary to react with a portion of the carboxylic groups to get the desired results. In the latter case from a statistical standpoint, even if sufficient epoxide were used to theoretically react with all of the —COOH groups, it is likely that some will not be reacted while others will have more than one ether linkage. It can be said that in the type of polymerization system under consideration, the cyclic ether taxogen will continue to polymerize on the telogen as long as monomer is fed to the system and so long as any impurities in it do not stop polymerization or telomerization and/or so long as the catalyst is not deactivated. The process of this invention is particularly directed to the obtainment of low molecular weight (up to 10,000), polymers having an OH functionality of about 2 and up to about 6, but it can be used to obtain high molecular weight polymers having a functionality of between 1 and 2.

This method may be used to modify high molecular weight copolymers such as those shown above, as well as carboxylic terminated substantially linear polymers such as carboxy terminated polybutadienes. Thus, when a solution of a carboxylic containing high polymer, the polymerizable cyclic ether monomer and the catalyst are brought together, the cyclic ether would add to the carboxylic groups. This process is usually referred to as grafting when applied to high molecular weight polymers, but may be seen to involve the same sequence of reactions herein described as telomerization when applied to small molecules.

The monomers can be telomerized with the telogen in the presence of the catalyst in mass (bulk), or in solvent (which can facilitate handling and transfer of heat). They, also, can be telomerized under inert and/or non-oxidizing conditions, for example, under an atmosphere of nitrogen, argon, neon, helium, krypton or other inert atmosphere. Alternatively, the inert gas can be omitted and the monomer telomerized only under pressure from any vaporized solvent if used, vaporized monomer or telogen. In some instances the telomerization can be conducted in reactors containing or open to the air provided the air is free of materials which would inhibit telomerization (i.e., conversion or molecular weight) and especially free of $H_2O$, although this procedure can be hazardous for some of the monomers are flammable. Also, some telomerization reactions go so fast as to be explosive. Advantageously, solvents are used in which the monomer and telogen are soluble. The solvent should be an inert or non-reactive to the reactants. Examples of useful solvents are heptane, octane, cyclohexane, toluene, benzene, trimethylpentane, tetrahydrofuran, methylene chloride, chloroform, trichloroethylene, and so forth and mixtures of the same.

The reactants should be relatively pure, by which is meant that the starting materials should be free, or essentially free, of water or other impurities which would reduce the effectiveness of, or kill the catalyst, or prevent the obtainment of the desired molecular weight of the polymer or the desired functionality of the polymer or slow, stop or prevent the reaction between the cyclic oxide and the telogen.

Since many of the reactants are volatile, the telomerization is advantageously conducted in a closed container and may be under pressure, e.g., 1 to 1000 grams/sq. cm. Pressure should be at least sufficient to maintain the liquid state for dispersion of catalyst and heat transfer although it is possible to bubble monomer into the solution.

Telomerization can be conducted at temperatures of from about 0°C. to 100°C., although somewhat wider temperature ranges can be used, e.g., −10 to 180°C. Preferably, temperatures of from about 25°C. to 80°C. are used for telomerization. An induction period of about ¼ to 2 hours or more may be observed with some of the catalysts. It is very desirable to telomerize while agitating the monomer(s), catalyst, telogen and solvent.

The catalyst generally becomes very well dispersed if not completely dissolved (molecularly dispersed) in the polymerization solution. Thus, centrifugation even after dilution in a non-viscous solvent does not usually remove a major proportion of the catalyst from the polymer. Chemical methods, however, have been found useful in removing major amounts of the catalyst. Ion exchange of the polymer in water-methanol solution can reduce the conductivity of the telomer many fold by reducing the catalyst or catalyst residue content. Passage through a bed of activated alumina either with or without a prior treatment with aqueous ammonia also reduces the catalyst residue in such polymers. The necessity of removal of the catalyst will depend on ultimate use of the polymer.

The amount of the catalyst employed in the process of this invention is not narrowly critical and is used in a minor amount sufficient to effect polymerization. It can vary from about 0.003 to about 5% by weight based on the polymerizable cyclic ether employed and is advantageously employed in an amount of from about 0.01 to 0.2%, by weight based on the amount of the cyclic ether employed.

The propagation step of this reaction is exothermic. Some monomers may telomerize very rapidly in the presence of this catalyst. This may be controlled by the concentration of the catalyst, by use of a diluent, and by the proper choice of temperature. Since heat transfer during propagation and transfer may be critical in medium and large size bath reactors, loop type reactors can be used to reduce the induction period by temperature cycling in the loop when the product is a liquid or semiliquid. Also, continuous telomerization systems may be used in which the telogen or monomer is fed into the system and polymer, etc., withdrawn.

Gel formation during telomerization with unsaturated monomers is not usually observed using the double metal cyanide catalysts and consequently gel inhibitors are not normally required. Antioxidants or antidegradants such as phenyl beta naphthylamine, PBNA, or other antidegradants are desirably added prior to or after polymerization to avoid degradation which might occur. PBNA may be used in an amount by weight approximately equal to the amount of the catalyst during telomerization. Some antidegradants may retard polymerization and should be added after telomerization.

In telomerizing according to the present invention, it is preferred to add the ingredients to the reactor in the following order: telogen, catalyst and monomer. However, for many purposes, all three materials can be added at once.

Incremental addition of monomer and telogen can be used to vary the molecular weight distribution of the telomer product. When the monomer is added incrementally, the distribution of molecular weights becomes narrower, apparently as a result of the mass action law, i.e., when the concentration of the monomer is lower, the transfer reaction is comparatively favored. On the other hand, incremental addition of the telogen leads to a wider distribution of molecular weight for essentially the same reason as above, i.e., the concentration of the transfer agent is initially lower and thereby the propagation step is favored.

By the use of incremental, alternate addition of a plurality of monomers, it is possible to form telomeric ethers having telomer moieties in the form of block copolymers. By this procedure, for example, using a pair of alkylene oxides of the formulae:

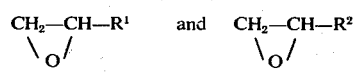

wherein $R^1$ and $R^2$ are dissimilar radicals from the group hydrogen, hydrocarbon, carbonoxycarbon, and halohydrocarbon having up to 16 carbon atoms, preferably alkyl radicals of 1 to 6 carbon atoms and carboxylic acid as the telogen, telomeric esters may be formed containing at least one copolymer unit of the formula:

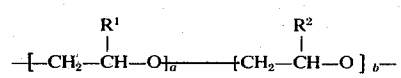

wherein $a$ and $b$ are integers and $a$ is typically greater than 5. Also, $b$ may be an integer typically greater than 5. Due to different reactivity rates, the blocks do not necessarily have all of the time the same number of monomeric units in each copolymer unit or in each molecule at the end of each addition or at the end of polymerization. Hence, $a$ and $b$ are not necessarily equal.

The solvent can be added separately or mixed with one or more of the ingredients. It can be added to the reactor first.

The polymers and copolymers (or telomers and cotelomers) prepared according to the method of the present invention have average molecular weights of at least 300, preferably from about 300 to 10,000, and even up to 150,000 or higher, such as up to 1,000,000 or more. They vary physically from light oils to tacky solids or semisolids, or even to solids, all of which are characteristically non-gelled. Some are one phase polymeric substances, others may contain two phases, one an oil and the other a crystalline polymer or high molecular weight polymer. Depending on the telogen used, they will have an average of from one to four or more hydroxyl groups and a plurality of ether linkages as expressed by the general formula given hereinbefore.

The polymer generally grows at one end with the monofunctional telogen and at both ends of the di (or higher) functional telogens. The use of some unsaturated monomers permits the resulting cotelomer to be vulcanized after extending with diisocyanate or other extending agent for use as a rubber. These polymers on the average characteristically have a small percentage of unsaturated end groups. The end group unsaturation (from about 0.005 to 0.020 mole equivalents unsaturation/gram) of the polymers remains constant as the molecular weight increases. Thus, the proportion of unsaturated end groups to hydroxyl end groups increases as the molecular weight increases. Nevertheless, polyethers prepared by the method of this invention have a low amount of unsaturation. For example, a polyether glycol of this invention having an average molecular weight of about 4000 may have 0.01 mole equivalent unsaturation per gram whereas a polyether glycol prepared with KOH and having an average molecular weight of about 3000 will have about 0.08 mole equivalent unsaturation per gram. As pointed out herein, polyether ester polyols having average molecular weights of from about 300 to 10,000 are preferred, and these molecular weights are obtained by shutting off the supply of epoxide, or by adding only a sufficient amount of the epoxide, to the polymerization system, or by killing the catalyst when the polymerization reaction has proceeded to the desired degree.

The telomers produced by the method of the present invention are useful in many ways. They are useful as nonionic surface active agents, as lubricants for metal to metal surfaces, as textile sizes or finishing agents, as coolants for internaal combustion engines and as hydraulic brake fluids. They can be used to make protective coatings and films for packaging. Telomers having average hydroxyl functionalities of 2, 3 or more hydroxyl groups per molecule can be used in making flexible and rigid polyurethane foams (for pillows, mattresses, insulation for refrigerators) by reaction with polyisocyanates, in the presence of tertiary amines, tin or other catalysts, silicones and so forth. Such telomers can also be employed in making millable (gums) or castable polyurethanes for bushings, coatings (clothing), laminates (wall panels), etc. The liquid telomers of this invention having an average molecular weight up to about 5000 from propylene oxide or butene oxide, etc., and a low molecular weight dicarboxylic acid are useful in making polyurethanes. When such millable gums contain unsaturation (carbon-to-carbon double bonds), they may be cured by conventional rubber curing procedures depending on the amount of unsaturation such as by using natural or butyl rubber curing systems or peroxides, etc. The telomers of this invention, also, can be used to make polyurethanes by reaction with phosgene and diamine.

The polymers (telomers and cotelomers) prepared by the method of the present invention as well as their extension products with isocyanates, etc., may be compounded or mixed if desired with the usual rubber and plastic compounding materials such as curing agents, anti-degradants, fillers, extenders, ultraviolet light absorbers, fire resistant materials, dyes, pigments, plasticizers, lubricants, other rubbers, resins, plastics and the like.

Where telomers of the invention are made using amines as the telogen, one can take advantage of amine groups created in the telomers either at the end or in the middle of the telomer chain by using them in cross-linking reactions with carboxylic acids or appropriate metal salts. Also, some of the telomers that contain secondary amine groups are useful as antizoants and antioxidants. If an unsaturated epoxide such as allyl glycidyl ether is used in the telomerization, e.g., in conjunction with propylene oxide as the monomer material, then one is able to make antiozonants that can be cured directly in rubber and will not be lost by migration and evaporation.

In the case of telomers made using amides as the telogen to contain a hydroxy group at one end of the chain and a tertiary amide on the other, such telomers may be crosslinked through metal salts that coordinate to the nitrogen atom in preference to the oxygen atom. The amide produced telomers may also be reduced to give amine terminal groups which can function in a number of cross-linking reactions.

The embodiments of the invention in which an exclusive property or right is claimed are defined as follows:

1. A process for the production of hydroxyl or thiol terminated alkylene ether telomers having an average molecular weight between 300 and 10,000 which comprises telomerizing polymerizable cyclic ether selected from the group consisting of ethylene oxide, 1,2-propylene oxide, 1,2-butene oxide, 2,3-butene oxide, 1,2-dodecane monoxide, isobutylene monoxide, 1,2-pentene oxide, isopentene oxide, 1,2-diisobutylene oxide, 1,2-hexene oxide, 1,2-heptene oxide, allyl glycidyl ether, crotyl glycidyl ether, isoheptene oxide, 1,2-octene oxide, 1,2-nonene oxide, styrene oxide, 1,2-decene oxide, 1,2-hendecene oxide, methyl glycidyl ether, ethyl glycidyl ether, propyl glycidyl ether, phenyl glycidyl ether, 4-chloro phenyl glycidyl ether, butadiene monoxide, isoprene monoxide, oxetane ($C_3H_6O$), tolyl glycidyl ether, 3,3-dimethyl oxetane, 3-n-nonyl oxetane, 3-allyl-3-methyl oxetane, 3-vinyl-3-methyl oxetane, 1,2-pentadecene oxide, 3,3-diethyl oxetane, 3-ethyl-3-butyl oxetane, 3-chloromethylene oxetane, 3-chloromethyl-3-methyl oxetane, 3-methyl-3-ethyl oxetane, 4,5-epithio-1-pentene; 5,6-epithio-1-hexene; 5,6 -epithio-2-hexene; 9,10-epithio-1-decene; 7,8-epithio-2-methyl-1-octene; 1,2-epithio-1-(2-cyclopenten-1-yl) ethane; 3-allyloxy-1,2-epithio propane; 3-(2-butenyloxy)-1,2-epithio propane; 1,2-epithio-1-(3-cyclohexen-1-yl)ethane; 3-(1-methyl allyloxy)-1,2-epithio propane; 3-(1-methyl-2-butenyloxy)-1,2-epithio propane; 3-(2-cyclohexen-1-yloxy)-1,2-epithio propane; 3-(3-methyl-4-hexenyloxy)-1,2-epithio propane; ethylene sulfide; 2,3-epithio butane; 1,2-propylene sulfide; cyclohexene sulfide; isobutylene sulfide; styrene sulfide; vinyl thiirone; 1,2-octene episulfide; crotyl oxy-1,2-epithio propane; 2-butene sulfide; 2,3-dimethyl-2-butene sulfide; 3,3-dimethyl thiocyclobutane; 3-chloropropene sulfide; thiocyclobutane; allyl thio-1,2-epoxy propane; 3-(1-chloro-4-butenyloxy)-1,2-epithio propane; 3-(1-bromo-4-butenyl)-1,2-epithio propane; 3-(1fluoro-4-butenyl thio)-1,2-epithio propene; and 3-(1-iodo-4-hexenyl thio)-1,2-epoxy propane, and mixtures thereof, with a telogen selected from the group consisting of aniline, N-alkyl anilines, p-phenylene diamine, p-aminophenol, p-methyl aniline, m-chloro aniline, o-hexyl aniline, p-iodoaniline, m-bromoaniline, 2-methyl-4-chloroaniline, 4-(p-aminophenyl) butanol, N-phenyl hexamethylene diamine, N-(p-tolyl) diethylene triamine, naphthylamine, N-phenyl-N'-naphthyl ethylene diamine and N-naphthyl-N'-hydroxy hexamethylene diamine, in the presence of a catalytic amount of a double metal cyanide complex catalyst.

2. The process of claim 1 wherein said catalyst is material having the general formula $Ma[M'(CN)_b]_c$ where $a$, $b$ and $c$ are numbers whose values are functions of the valences and coordination numbers of M and M', where M is metal selected from the group consisting of zinc (II), nickel (II), cobalt (II) and iron (II), and M' is metal selected from the group consisting of iron (II), iron (III), cobalt (III) and chronium (III) and complexes said material with a substantially water-soluble saturated acyclic aliphatic polyether free of active hydrogen having a molecular weight up to about 400.

3. The process of claim 1 wherein said catalyst is selected from the group consisting of zinc hexacyanoferrate (III), zinc hexacyanoferrate (II), nickel (II) hexacyanoferrate (II), nickel (II) hexacyanoferrate (III), zinc hexacyanoferrate (III) hydrate, cobalt (II) hexacyanoferrate (II), nickel (II) hexacyanoferrate (III) hydrate, ferrous hexacyanoferrate (III), cobalt (II) hexacyanocobaltate (III), zinc hexacyanochromate (III) and mixtures thereof.

4. The process of claim 3 wherein said oxide is propylene oxide and said amine is p-phenylene diamine.

5. The process of claim 3 wherein said oxide is selected from the group consisting of ethylene oxide, propylene oxide, allyl glycidyl ether, crotyl glycidyl ether, 1,2-butene oxide, phenyl glycidyl ether, styrene oxide, ethyl glycidyl ether and propyl glycidyl ether.

6. A process for the production of hydroxyl terminated alkylene ether telomers having an average molecular weight between about 300 and 10,000 by reacting polymerizable cyclic ether selected from the group consisting of ethylene oxide; propylene oxide; allyl glycidyl ether; crotyl glycidyl ether; 1,2-butene oxide; phenyl glycidyl ether; styrene oxide; ethyl glycidyl ether and propyl glycidyl ether with an amine selected from the group consisting of aniline, N-ethyl aniline and p-phenylene diamine in the presence of a catalytic amount of a double metal cyanide complex catalyst.

7. A process for the production of hydroxyl terminated alkylene ether telomers having an average molecular weight between about 300 and 10,000 by telomerizing a polymerizable cyclic ether selected from the group consisting of ethylene oxide; propylene oxide; allyl glycidyl ether; crotyl glycidyl ether; 1,2-butene oxide; phenyl glycidyl ether; styrene oxide; ethyl glycidyl ether and propyl glycidyl ether with an amine selected from the group consisting of aniline, N-ethyl aniline and p-phenylene diamine in the presence of a catalytic amount of a double metal cyanide complex catalyst selected from the group consisting of zinc hexacyanoferrate (III), zinc hexacyanoferrate (II), nickel (II) hexacyanoferrate (II), nickel (II) hexacyanoferrate (III), zinc hexacyanoferrate (III) hydrate, cobalt (II) hexacyanoferrate (II), nickel (II) hexacyanoferrate (III) hydrate, ferrous hexacyanoferrate (III), cobalt (II) hexacyanocobaltate (III), zinc hexacyanochromate (III), and mixtures thereof.

8. The process of claim 7 wherein the ratio of mols of said cyclic ether to the number of amine groups in said amine is between about 240:1 and 1:1 and the telomerization is conducted at a temperature between about 0° – 100°C under pressure sufficient to maintain the reactants in the liquid state between about 1 to 1000 grams/sq. cm..

* * * * *